United States Patent [19]

Bowles

[11] Patent Number: 4,939,864
[45] Date of Patent: Jul. 10, 1990

[54] VISUAL FISHING AID

[76] Inventor: Thomas J. Bowles, P.O. Box 6034, Dayton, Ohio 45405

[21] Appl. No.: 431,749

[22] Filed: Nov. 3, 1989

[51] Int. Cl.$^5$ .............................................. A01K 89/01
[52] U.S. Cl. ............................................ 43/17; 43/25
[58] Field of Search ................................. 43/16, 17, 25

[56] References Cited

U.S. PATENT DOCUMENTS

| 4,125,957 | 11/1978 | Cunnigham | 43/17 |
| 4,236,340 | 12/1980 | Cunnigham | 43/17 |
| 4,552,318 | 11/1985 | Durham | 43/17 |
| 4,702,031 | 10/1987 | Sousa | 43/17 |

Primary Examiner—Richard K. Seidel
Assistant Examiner—James Miner
Attorney, Agent, or Firm—Joseph Patrick Burke

[57] ABSTRACT

The disclosure is directed to a visual fishing aid comprised of a substantially rectangularly shaped plastic plate having a plurality of openings or holes to retain spring rings (necklace claspers) inserted therein to allow the plate to slide along fishing line which is threaded through the openings in the spring rings, a plurality of anti-sail (anti-sway) openings to allow wind to pass through this plate so that the plate does not whip around and cause the fishing line to become snagged or twisted around the pole and a ballast glued or otherwise attached to the lower longitudinal (long) portion of said plate to make the plate more stable and to assist it in holding its position on the fishing line during use.

14 Claims, 1 Drawing Sheet

VISUAL FISHING AID

BRIEF DESCRIPTION OF THE INVENTION

The present invention is directed to a visual fishing aid comprised of a substantially rectangularly shaped plastic plate having a plurality of openings or holes to retain spring rings (necklace claspers) inserted therein to allow the plate to slide along fishing line which is threaded through the openings in the spring rings, a plurality of anti-sail (anti-sway) openings to allow wind to pass through this plate so that the plate does not whip around and cause the fishing line to become snagged or twisted around the pole and a ballast glued or otherwise attached to the lower longitudinal (long) portion of said plate to make the plate more stable and to assist it in holding its position on the fishing line during use.

BACKGROUND OF THE INVENTION AND PRIOR ART

One of the most difficult tasks for a fisherman to attempt to master is the task of knowing when to attempt to set the hook when the fish is nibbling or biting at the bait on his fishing line. This is particularly true when the fishing method is by rod and reel with line, hook, bait and sinker. This problem seems to be more accentuated especially when fishing for the smaller-type fish such as bluegill, crappie, etc., which happen to be very tasty yet difficult to hook consistently.

Thus various attempts have been made using a variety of approaches to increase the fisherman's odds of landing the fish which is biting at the bait on the hook at the end of his line. The objective then is to increase the percent catches of the fish versus bites while fishing.

U.S. Pat. No. 2,816,387, issued to F. C. Crowe et al, is directed to a fishing indicator and switch therefor which is a combination or what appears in FIG. 2 to be a flashlight with a switch connected to the upper surface of the flashlight on its lower end and to the fishing line 13 on its upper end 40. Bifurcated member 40 has a generally arcuate configuration as is shown in FIG. 3. Downward pressure on the line 13 when caused by a strike by the fish creates pressure on compression spring 43 which causes the switch to turn the light on giving visual indication as shown in FIG. 1 to the angler.

U.S. Pat. No. 3,053,003, issued to E. A. Barnes et al, is directed to an audible signal device for fishing poles wherein a noise producing member is slidably mounted by coil springs 15 and 16 to secure the pole as shown in FIG. 2 of Barnes et al. The fishing line 30 is looped around the spool portion 18 of the spindle 17 rotatably mounted on the base 18 of the audible signal device. As pressure is exerted on the distal portion of the line 30 (outward of the spindle), spring 20 operates to provide an audible signal to the angler letting him know that a fish is biting or striking.

U.S. Pat. No. 4,236,340, issued to James C. Cunningham, is directed to a fishing rod indicator assembly which may be semi-permanently or permanently mounted on a standard fishing rod wherein the mounting means has a weight through which the fishing line is trained permitting the weight to move by gravity from its first position to a second, use position, spaced from the rod and whereby a portion of the fishing line is drawn away from the rod so that the weight, in its second position, is shiftable in response to the bite of the fish on the line to visually signal the bite to the angler upon movement of the weight.

U.S. Pat. No. 2,601,839, issued to J. Kucewicz, is directed to a fishing pole signal of the audible type comprising a cylindrical body 10, having a peripheral band formation 11 which has a boss 12 projecting radially therefrom. The boss has a groove 13 therearound to provide a neck and head formation at the outer portion thereof. To the boss is attached a bell comprised of a shell like member 15 with opening 16 and slotted to form segments 18 which enclose a suitable ball 19. The ball 19 strikes the shell when the latter is moved suddenly to produce a ringing sound. This ringing sound then alerts the angler to the presence of a fish.

U.S. Pat. No. 2,196,784, issued to A. W. Simmons et al, is directed to a visual fishing device attached to a fishing pole 10. The fishing device 13 is basically a battery operated flashlight whose lens 19 faces rearwardly toward the angler and whose distal end has a leg trigger 30 terminating in coils 38 through which the fishing line 12 coming from the reel 11 is threaded prior to threading it through the eyelets of the rod. The proximal end of the leg 37 shown at 30 operates the trigger turning on the flashlight giving the angler a visual signal upon movement of the line through the coil portion 38.

U.S. Pat. No. 3,744,172, issued to John W. Kelli, is an audible signal device indicating the presence of a fish on the fishing line, which device incorporates a resilient air bellows that is compressed when a resilient shock cord is stretched beyond its normal extension due to the increased tension produced by the fish on the line. The air expelled from the bellows passes through a whistle to produce an audible signal to the angler.

U.S. Pat. No. 4,702,031, issued to David W. Sousa, is directed to a method and apparatus providing a visual bite indication by movement of a weighted mass on the fishing line. The weighted mass is suspended upon the line between proximal conventional rod eyelet 22 and special magnetic eyelet 28 mounted medially on the pole. Weighted mass 24 is preferably magnetic as is special eyelet 28 so that the weighted mass 24 is adapted for being secured to special eyelet 28 during casting of the bait to prevent the weighted mass 24 from interfering with forward passage of the line in casting. Upward movement of the weighted mass 24 which is fished with slack line between eyelets 22 and 28 gives a visual signal to the angler as to the presence of the fish.

U.S. Pat. No. 4,125,957, issued to James C. Cunningham, is directed to a fishing rod holder and indicator assembly wherein a portion of the rod is mounted between a bifurcated upper end fishing rod holder. The fish bite-indicator assembly is adapted for use with an ordinary fishing rod and line and comprises a weighted, slack ring device slidably attached to a stretch of the fishing line between guide ferrules of the rod and produces gravity-induced sagging of the line from the rod in the absence of a fish bite when the rod is in a position tilted from vertical due to its location within the fishing rod holder to create a slack section in the line along the rod. The slack ring 38 holds the slack line section between the rod ferrules 16 and 18 in tension and is stated to function in response to even minute movement of the bait in any direction during a fish bite to sharply shift in elevation, thereby signally the bite to the angler. The lower end 42 of the bite-indicator is attached via line 48 and swivel mechanism 50 to the outer extremity of a standoff member 52 and more particularly to an eyelet 54 therein. The remaining neck portion 40 of the slack ring signally device 38 is attached to the fishing line.

U.S. Pat. No. 4,552,318, issued to B. Elwood Durham, is directed to a closed face fishing reel modified or initially formed to provide a seat adjacent to the opening through which the fishing line passes. The seat may be formed as a separate member attachable in any suitable manner to the face of the reel or the reel body itself may be formed during manufacture to provide a seat of the proper size and position. An annular member, which is employed as a strike indicator, is made of such size as to be frictionally received on the seat for convenient storage when not in use. The fish strike indicator includes an eyelet 38 through which the fishing line extends having a flange 39 adapted to bear against the front face 40 of the tubular member 34 and then be secured thereto by any suitable adhesive. The annular member 22 (fish strike indicator, itself) has an inner diameter 48 which corresponds closely to the outer diameter 50 of the component 34 so it friction fits so as to be retained firmly thereon.

It should be readily apparent that most, if not all, of the aforementioned prior art patents are more complicated and hence expensive than that of the present invention and none teaches the structure thereof.

DETAILED DESCRIPTION OF THE INVENTION

Figure 1:
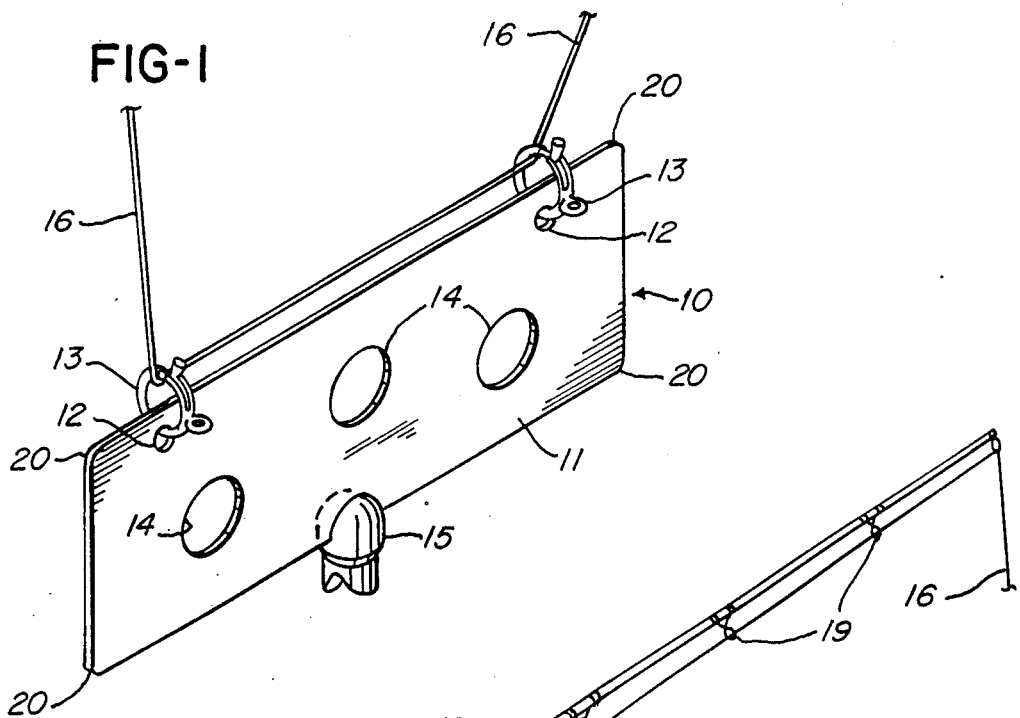
FIG. 1 of the drawings is a perspective view showing the visual fishing aid of this invention positioned on a slack loop of a fishing line.

As is shown in FIG. 1, the present visual fishing aid 10 contains a substantially rectangularly shaped plate 11 having openings 12 in which are positioned spring rings (necklace claspers) 13 for attachment of the visual fishing aid to a loop of fishing line between rod eyelets 19. Plate 11 also contains anti-sail openings 14, preferably of larger diameter than openings 12. Also included on the plate 11 is a ballast or weight means 15 which can, for example, be split lead shot of varying weight depending upon the fishing conditions encountered, for example, current in which the fishing is taking place, wind present at this location, etc. Although ballast 15 can be placed at any desired location along the plate 11 lower portion, usually it is placed medially. The ballast can be glued, adhered or otherwise attached to the lower (longitudinal) portion of plate 11. Hot melt glues are preferred for this purpose.

Figure 2:
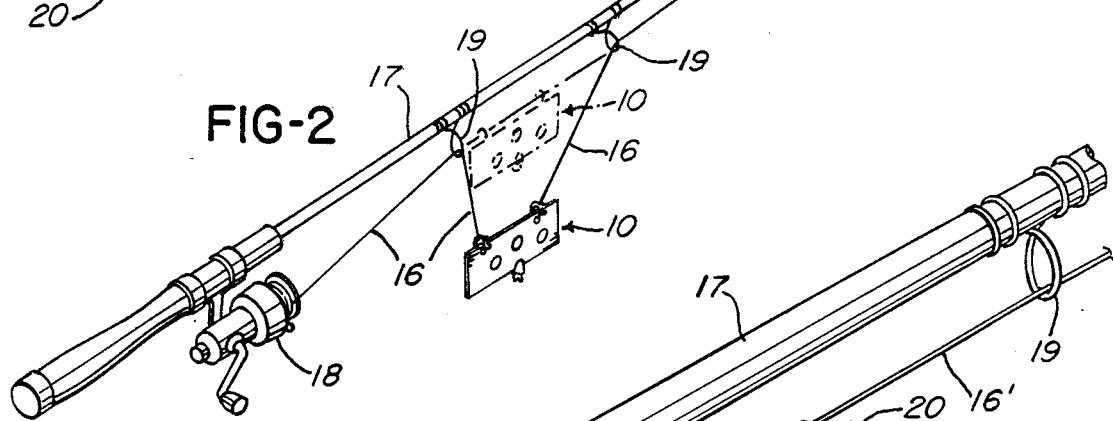
FIG. 2 is a perspective view of the visual fishing aid of this invention showing it in place on a slack portion of fishing line on a conventional fishing rod with reel with partial phantom line view as the bite/strike by the fish is occurring, viz., the upward movement that happens during such strike/bite.

As will be apparent from FIGS. 1 and 2, visual fishing aid 10 is fished by forming a loop of line 16 between adjacent eyelets 19 in fishing line 16 after the line has been cast into 15 the water. Visual fishing aid 10 is attached to line 16 by opening the spring rings and placement of the rings upon the fishing line 16, as is shown in FIG. 1. This can be done before or after forming the loop, but after casting.

When a bite or strike occurs, this causes the line 16 (FIG. 3) to tighten so as to become taut as shown at 16'. This in turn causes the visual fishing aid 10 to rapidly move upwardly as is shown in the phantom line in FIG. 2 to a position shown in FIG. 3.

The fishing aid of this invention can be used with any conventional rod 17, reel 18 and line 16. This fishing aid is inexpensive, simple to produce, yet highly effective as a visual indicator that a bite/strike has taken place. It is not necessary to remove this fishing aid from the fishing line as the line is being reeled in during the process of landing the fish. What usually occurs with the fish on the line is that the visual fishing aid 10 moves rearwardly (proximally) against the eyelet of the fishing rod in the direction of the reel. Visual fishing aid 10 is retained on the fishing line between the rod eyelets as the fish is landed.

Figure 3:
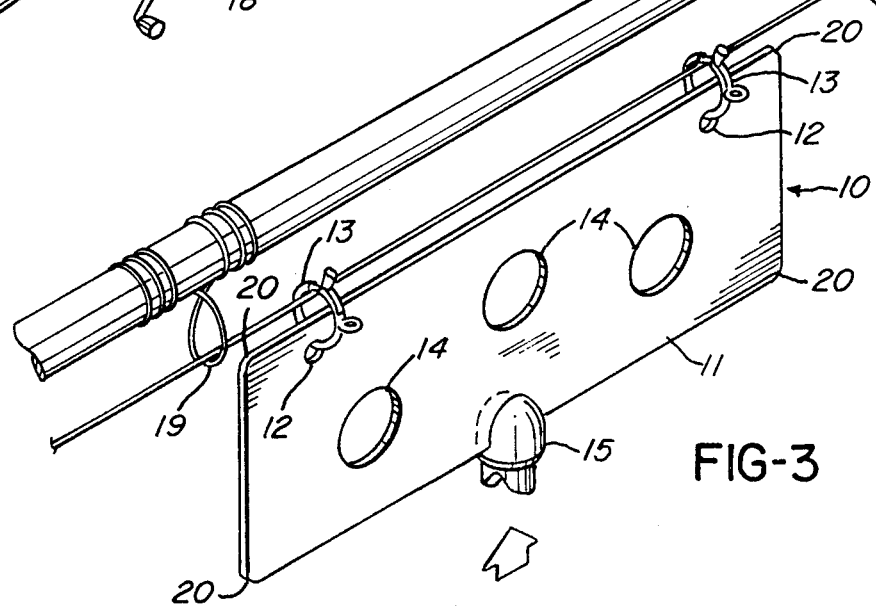
FIG. 3 of the drawings is a partial perspective view with the visual fishing aid of this invention in its upper most position on the fishing line between eyelets indicating that the strike/bite by the fish has occurred causing upward movement in the direction shown by the arrow.

The attachment of the fishing aid to the line 16 is accomplished in a rapid, straightforward fashion simply by applying pressure to open the spring rings and place same on the fishing line between a pair of eyelets 19 which are on the rod. According to a preferred embodiment of this invention, the substantially rectangularly shaped plate 11 has rounded ends as shown at 20 (FIGS. 1 and 3).

Plate 11 can be made from any hard material, such as steel, aluminum, light weight, strong composite material, viz., fiberglass-plastic composites, fiberglass-resin composites, plastic, etc. Moreover, plate 11 can be provided with designs, such as stripes, dots, etc., which can be made from fluorescent or phosphorescent material. Such designs can be incorporated integrally into the plate when formed, or they can be applied thereto subsequent to its initial formation. Moreover, plate 11 can be made entirely of material containing fluorescent or phosphorescent material.

While plate 11 can be of any desired size, for many fishing applications plate thicknesses ranging from about 0.010 inch to about 0.125 inch should suffice with plate lengths usually ranging from about 2 inches to about 5 inches and plate widths ranging from about 0.5 inch to about 2 inches.

The visual fishing aid of this invention can be readily stamped from the material selected for manufacture. Moreover, openings 12 and 14 can be stamped as well.

It will be observed that the visual fishing aid 10 of this invention can be varied to suit the fishing conditions encountered, e.g., by controlling the size thereof, varying the diameter of anti-sail openings 14 and varying the weight and number of ballast 15. Moreover, the fishing aid of this invention although more ideally suited to freshwater fishing, can be fished in salt water as well.

I claim:

1. A fish strike indicator comprising a substantially rectangularly shaped plate, a plurality of openings located on one longitudinal (long) portion of said plate, a plurality of spring ring means for attaching to a fishing line, said ring means positioned within said openings in said plate, a plurality of anti-sail openings located elsewhere in said plate and ballast means located on the lower portion of said plate.

2. A fish strike indicator as in claim 1 wherein said anti-sail openings are larger in diameter than said spring ring openings.

3. A fish strike indicator as in claim 1 wherein said rectangular plate is formed from hard material.

4. A fish strike indicator as in claim 1 wherein said ballast means comprises at least one metallic split shot sinker.

5. A fish strike indicator as in claim 1 wherein said substantially rectangular plate has rounded corners.

6. A fish strike indicator as in claim 1 wherein said rectangular plate has a thickness ranging from about 0.010 inch to about 0.125 inch.

7. A fish strike indicator as in claim 1 wherein said substantially rectangular plate has a length ranging from about 2 inches to about 5 inches.

8. A fish strike indicator as in claim 1 wherein said substantially rectangular plate has a width ranging from about 0.5 inch to about 2 inches.

9. A fish strike indicator as in claim 1 wherein said substantially rectangular plate is plastic.

10. A fish strike indicator as in claim 1 wherein said substantially rectangular plate is metal.

11. A fish strike indicator as in claim 1 wherein said substantially rectangular plate is composite material.

12. A fish strike indicator as in claim 1 wherein said substantially rectangular plate contains material which glows in the dark.

13. A fish strike indicator as in claim 1 wherein at least one of the major surfaces of said substantially rectangular plate is provided with indicia.

14. A fish strike indicator as in claim 1 wherein at least a portion of one major surface of said substantially rectangular plate is provided with material which glows in the dark.

* * * * *